US006452727B1

(12) United States Patent
Okuyama

(10) Patent No.: US 6,452,727 B1
(45) Date of Patent: *Sep. 17, 2002

(54) PROJECTION LENS

(75) Inventor: Atsushi Okuyama, Tokorozawa (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/435,193

(22) Filed: Nov. 8, 1999

(30) Foreign Application Priority Data

Nov. 10, 1998 (JP) ............................. 10-334944

(51) Int. Cl.[7] .............................. G02B 3/00; G02B 3/02
(52) U.S. Cl. ...................... 359/649; 359/648; 359/708; 359/720
(58) Field of Search .................. 359/648, 649, 359/651, 670, 680, 682, 708, 720

(56) References Cited

U.S. PATENT DOCUMENTS

| 5,550,679 A | * | 8/1996 | Sugawara ................ 359/689 |
| 5,648,871 A | * | 7/1997 | Okuyame et al. ........... 359/557 |
| 5,986,806 A | * | 11/1999 | Sugawara ................ 359/557 |
| 6,104,537 A | * | 8/2000 | Togino .................. 359/629 |

* cited by examiner

*Primary Examiner*—Georgia Epps
*Assistant Examiner*—David N. Spector
(74) *Attorney, Agent, or Firm*—Morgan & Finnegan, LLP

(57) ABSTRACT

A projection lens arranged to project an image formed on a display panel onto a screen includes a plurality of lens units movable along an axis for varying magnification, wherein at least one of lenses constituting the plurality of lens units has at least one lens surface of shape having no symmetry with respect to the axis, so that the trapezoidal deformation which tends to occur when the image formed on the display panel is projected onto the screen is corrected well.

22 Claims, 15 Drawing Sheets

PROJECTION LENS

BACKGROUND OF THE INVENTION

1. Field of the Invention

The present invention relates to projection lenses and image projection apparatuses using the same and, more particularly, to projection lenses suited to, for example, liquid crystal projectors of the type in which an original projection image displayed on a display panel, such as a liquid crystal display element, is projected obliquely onto a screen in an enlarged size. Still more particularly, the present invention relates to such a liquid crystal projector that has a projection lens appropriately designed to correct well the distortion and trapezoidal deformation of the projected image and the declination of the image plane so that a projected image of good quality can be obtained.

2. Description of Related Art

Heretofore, there have been proposed a variety of projection apparatuses arranged to project an original projection image displayed on a display panel, such as a liquid crystal display element, onto a screen.

FIG. 21 is a diagram of geometry of the arrangement of a projection apparatus of the oblique projection type in which an original projection image LCD is obliquely projected onto a screen S by a projection lens LP.

In the projection apparatus shown in FIG. 21, for the purpose of preventing the projected image from being distorted when the original projection image LCD is projected on the screen S, the so-called image frame shifting is utilized in which the center LCDa of the original projection image LCD is shifted downward with respect to an optical axis Ax of the projection lens LP.

In the conventional liquid crystal projector, when installed in the apparatus, despite a short projection distance as usual, the projected image has to appear more upper. To this purpose, the projection lens is made wider in the image angle. The center of the liquid crystal panel is thus allowed to take an offset (shifted) position relative to the optical axis of the projection lens, so that the center of the projected image appears upper than the optical axis of the projection lens.

However, when the image angle of the projection lens is widened, distortion, field curvature, lateral chromatic aberration and other aberrations become larger, causing an increase of the difficulty of correcting these various aberrations.

Particularly with the distortion left large, because the projected image is offset from the optical axis, the projected image is distorted asymmetrically in the vertical direction, giving rise to a problem of detracting the quality of the projected image.

To solve this problem, among others, a method of introducing an axially-symmetric aspheric surface into the projection lens, too, has been put into practice. However, since the original projection image LCD is offset as shown in FIG. 22, it is difficult correct the distortion throughout an image circle IC including the entirety of the original projection image LCD.

BRIEF SUMMARY OF THE INVENTION

It is an object of the present invention to provide, by using an aspheric surface having no axial symmetry in a part of an optical system, a projection lens which can correct trapezoidal deformation and distortion as an original projection image is projected obliquely, and an image projection apparatus using such a projection lens.

To attain the above object, in accordance with an aspect of the invention, there is provided a projection lens arranged to project an image formed on a display panel onto a screen, the projection lens comprising a plurality of lens units movable along an axis for varying magnification, wherein at least one of lenses constituting the plurality of lens units has at least one lens surface of shape having no symmetry with respect to the axis.

Further, in the above projection lens, the display panel and the axis are almost orthogonal with each other, and a center of the display panel is offset from the axis.

Further, in the above projection lens, a normal of the display panel makes an angle θ with the axis, wherein the following condition is satisfied:

$$-5° < \theta < 5°$$

Further, in the above projection lens, at least one of lenses constituting the plurality of lens units has at least one aspheric surface of shape having symmetry with respect to the axis.

Further, the above projection lens comprises, in order from the screen side, a negative lens unit having a negative refractive power and a positive lens unit having a positive refractive power.

Further, in the above projection lens, the negative lens unit has a lens surface of shape having no symmetry with respect to the axis.

Further, in the above projection lens, the negative lens unit comprises, in order from the screen side, a lens subunit of meniscus form convex toward the screen side, a lens subunit of bi-concave form, and a lens subunit of bi-convex form.

Further, in the above projection lens, the lens subunit of meniscus form has a lens surface, facing the screen side, of shape having no symmetry with respect to the axis.

Further, in the above projection lens, the positive lens unit has an aspheric surface having symmetry with respect to the axis.

The above and further objects and features of the invention will become apparent from the following detailed description of preferred embodiments thereof taken in conjunction with the accompanying drawings.

DETAILED DESCRIPTION OF THE INVENTION

Figure 1:
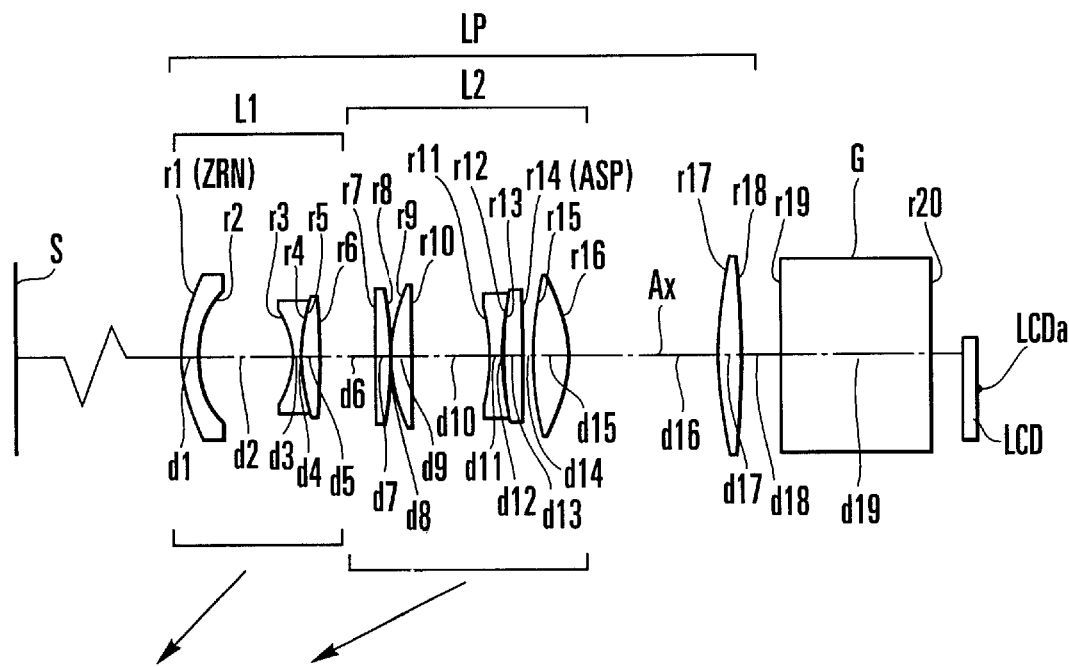
FIG. 1 is a longitudinal section view of a numerical example 1 of the lens of the invention.

Hereinafter, preferred embodiments of the invention will be described in detail with reference to the drawings.

FIGS. 1 to 4 in block diagram show numerical examples 1 to 4 of the lens of the invention, whose data will be given later.

In FIGS. 1 to 4, a projection lens (projection optical system) LP, an optical block G, such as an optical filter, a color separation prism, etc., and a projection image LCD formed on a display panel, such as a liquid crystal element, are arranged in this order from a screen S.

Further, reference character ZRN denotes an aspheric surface having no axial symmetry, and reference character ASP denotes an axially-symmetric aspheric surface. The projection lens LP has a lens unit L1 of negative refractive power and a lens unit L2 of positive refractive power, both of which axially move toward the screen S, while decreasing the separation therebetween, to vary the focal length from the wide-angle end to the telephoto end. Accordingly, the size of the projected image on the screen S is made variable. Further, a fixed lens (r17-r18) is disposed immediately before the optical block G.

The center LCDa of the projection image LCD is shifted (decentered in parallel) from an optical axis (reference axis) Ax of the projection lens LP.

Figure 2:
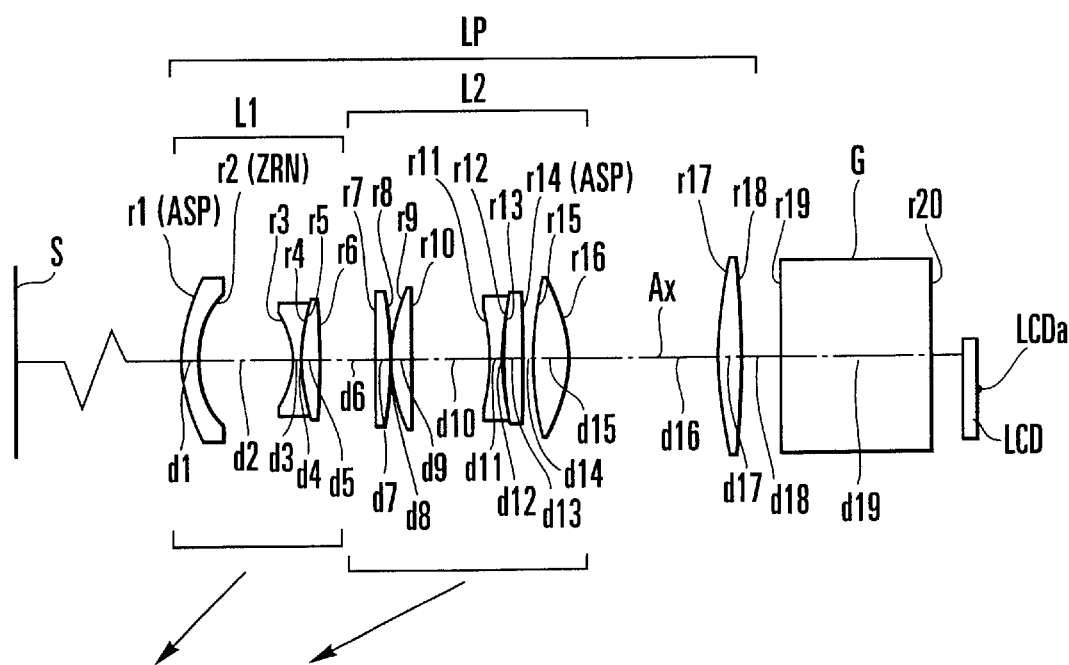
FIG. 2 is a longitudinal section view of a numerical example 2 of the lens of the invention.
Figure 3:
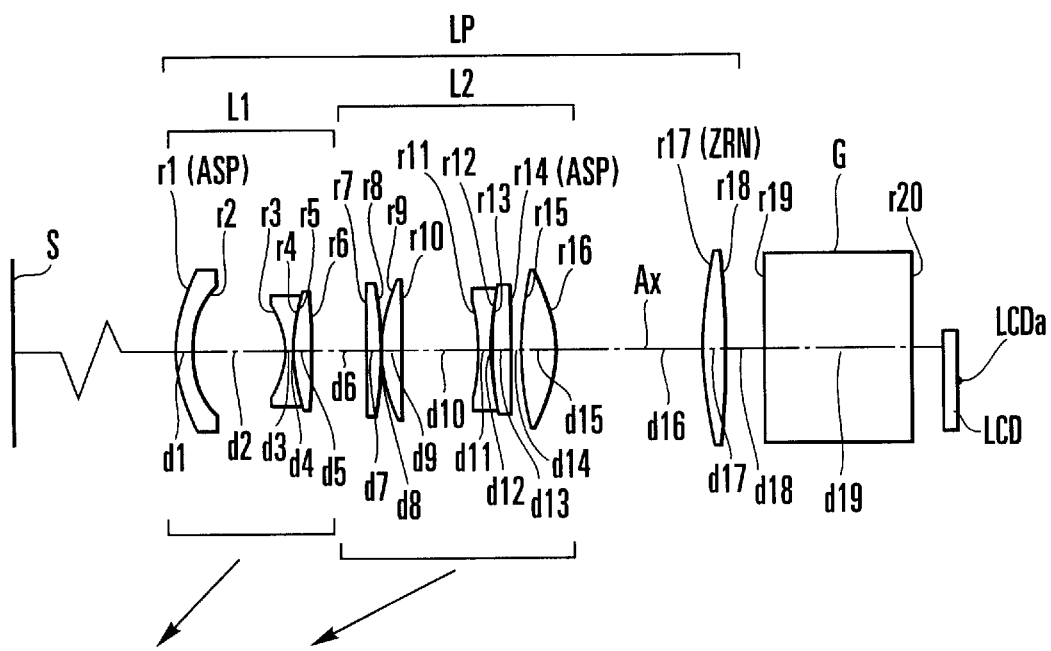
FIG. 3 is a longitudinal section view of a numerical example 3 of the lens of the invention.

In the numerical examples 1 to 3, as shown in FIGS. 1 to 3, the screen S and the projection image LCD are parallel to each other, and both the screen S and the projection image LCD are perpendicular to the optical axis Ax of the projection lens LP. The projection lens LP projects the projection image LCD onto the screen S in enlarged scale at various magnifications.

Figure 4:
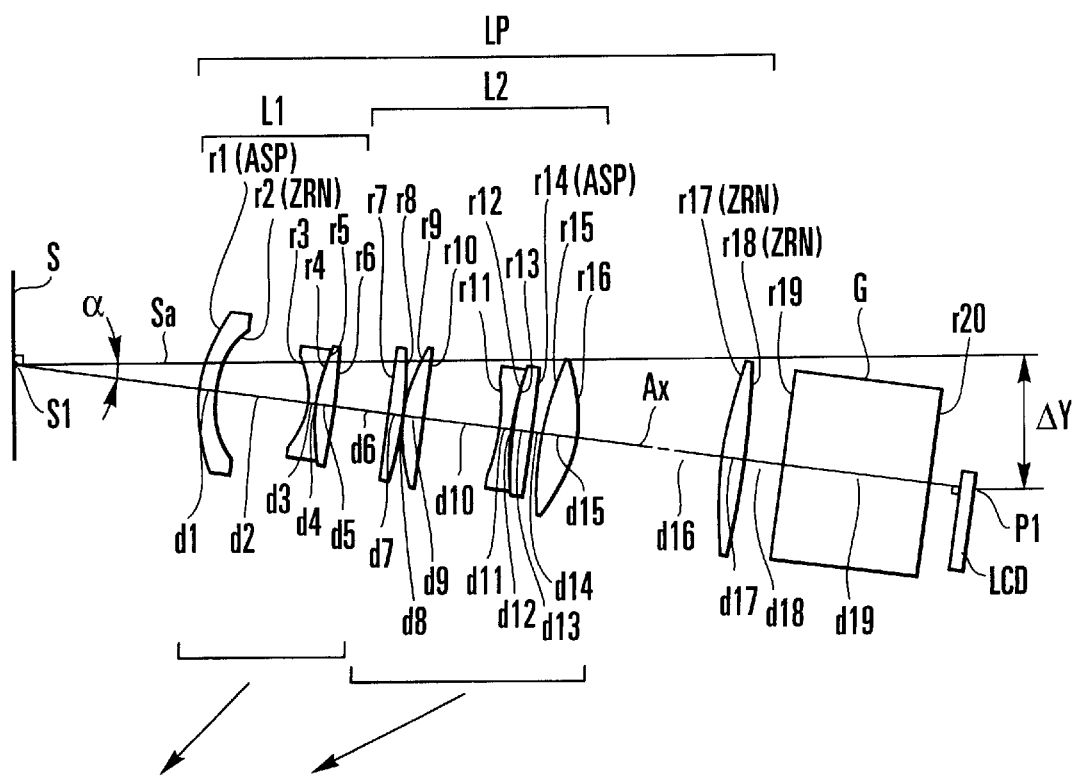
FIG. 4 is a longitudinal section view of a numerical example 4 of the lens of the invention.

In the numerical example 4, as shown in FIG. 4, while the projection image LCD is perpendicular to the optical axis Ax of the projection lens LP, the optical axis Ax of the projection lens LP is made tilted with respect to the screen S, (or the optical axis Ax is made to have a predetermined angle α with the normal Sa of the screen S).

Further, in the numerical examples 1 to 4, with the use of the aspheric surfaces ZRN and ASP mentioned before, the distortion produced by the oblique projection is corrected. (Incidentally, the term "reference axis (reference optical axis)" used in the invention means an optical axis specified by at least two lens surfaces in the projection lens LP.) The projection lens LP projects the projection image LCD onto the screen S in enlarged scale at various magnifications.

Figure 5:
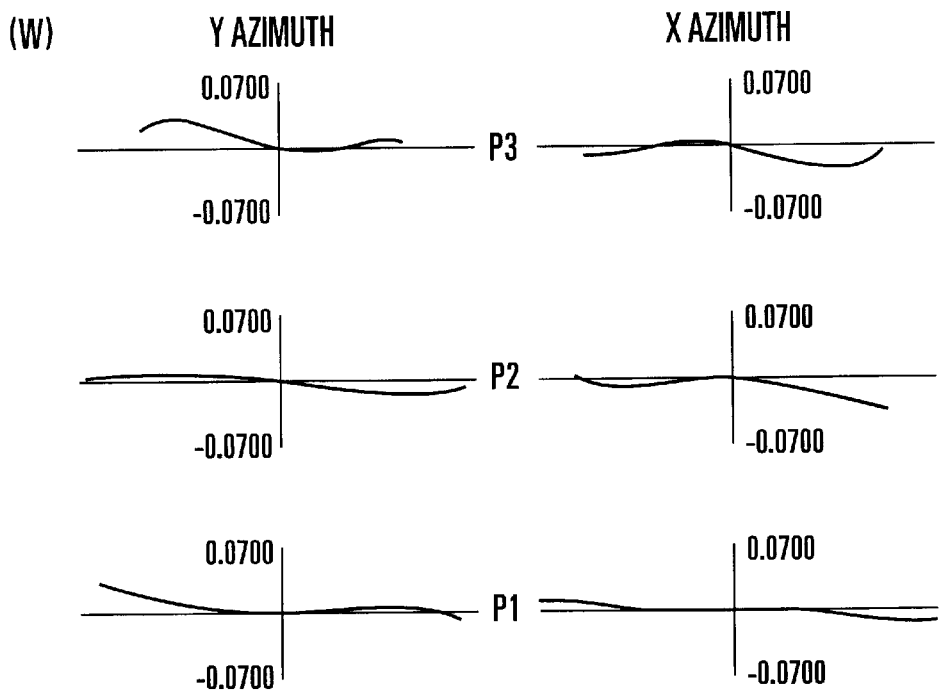
FIG. 5 shows graphic representations of the aberrations in the numerical example 1 of the invention in the wide-angle end.
Figure 6:
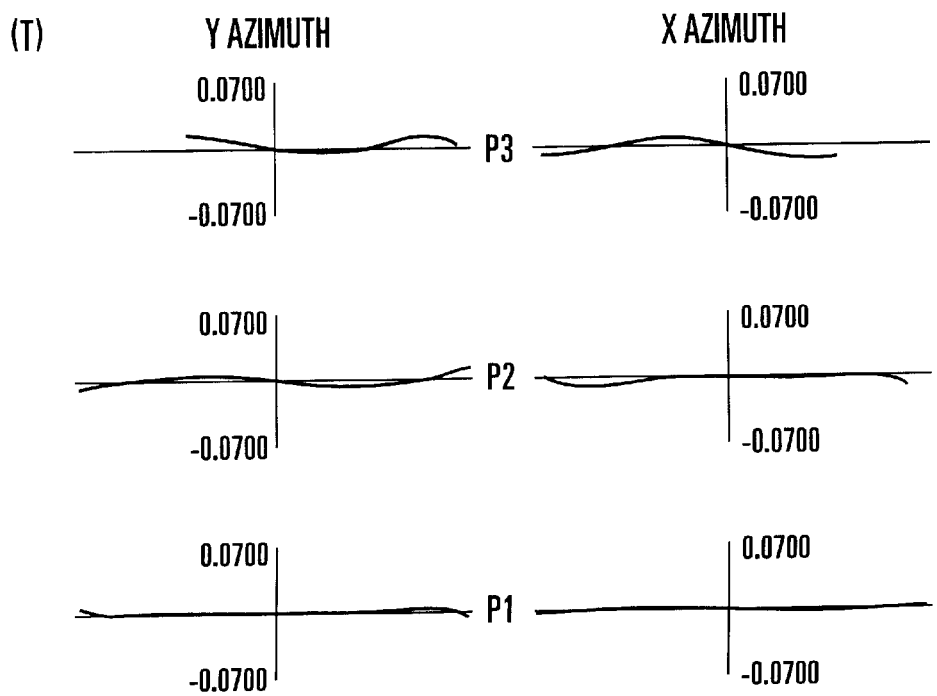
FIG. 6 shows graphic representations of the aberrations in the numerical example 1 of the invention in the telephoto end.
Figure 7:
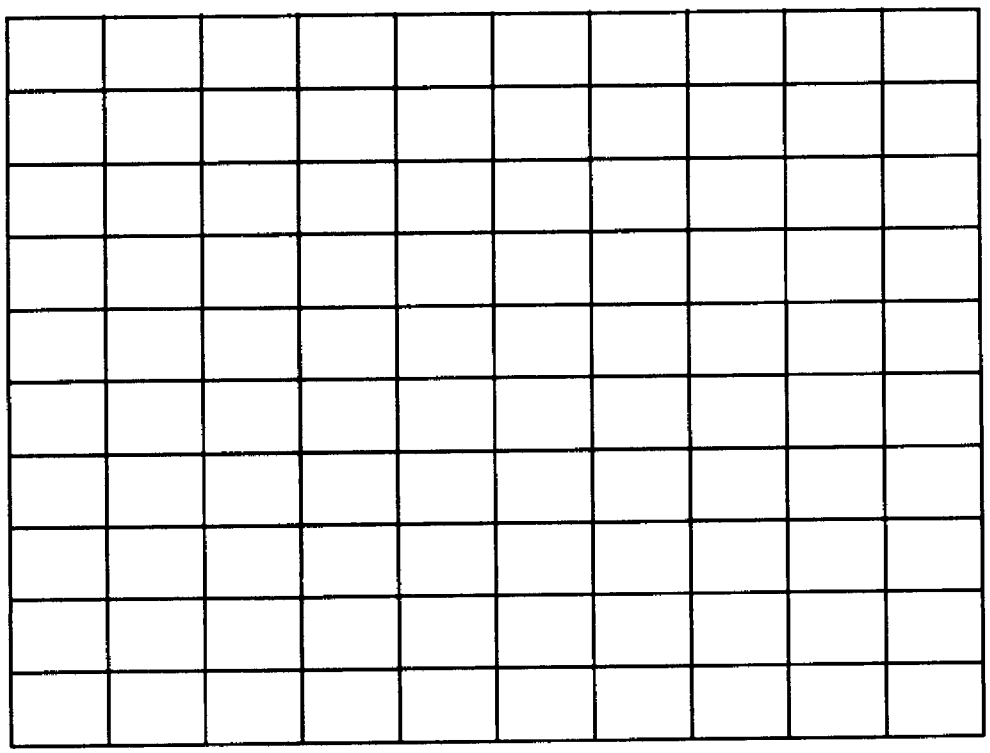
FIG. 7 is a plan view for explaining the distortion in the numerical example 1 of the invention.

FIGS. 5 to 7 show the lateral aberrations of the numerical example 1 in the wide-angle end and in the telephoto end and a lattice used for explaining the state of distortion.

Figure 8:
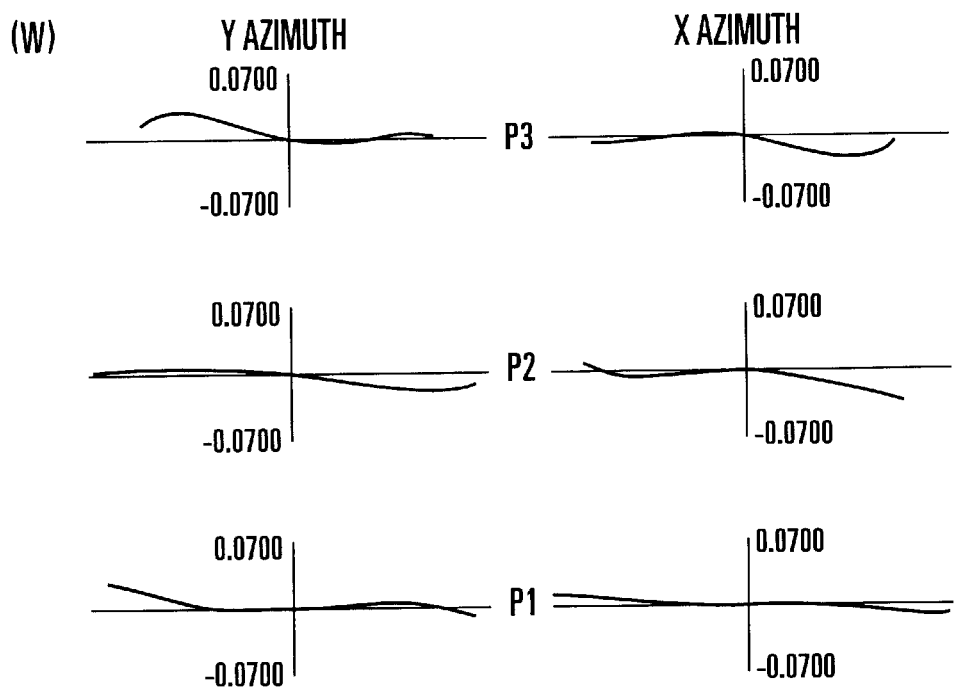
FIG. 8 shows graphic representations of the aberrations in the numerical example 2 of the invention in the wide-angle end.
Figure 9:
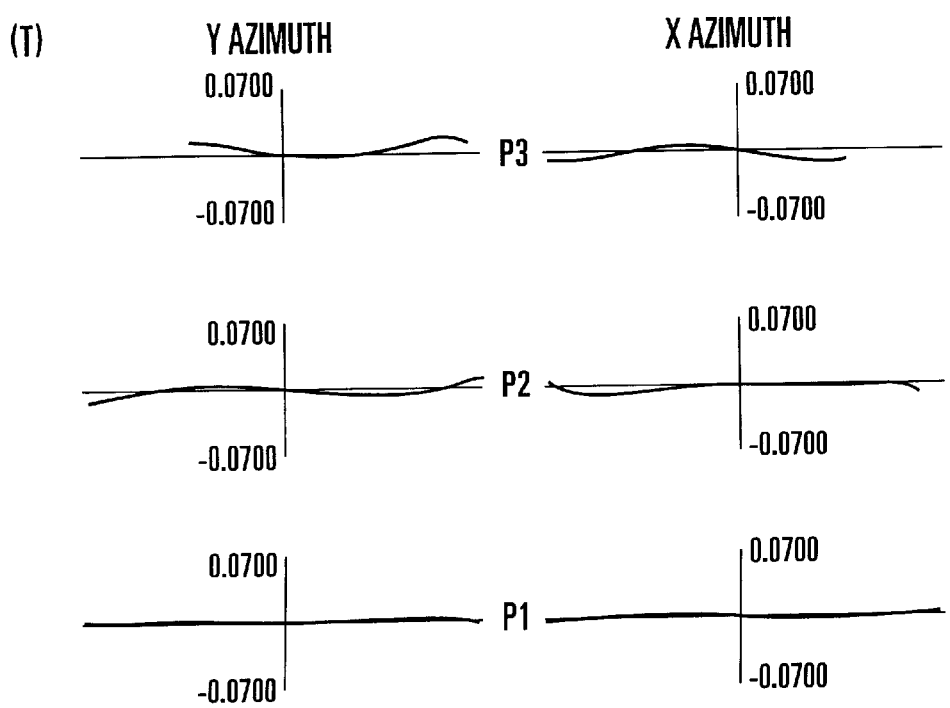
FIG. 9 shows graphic representations of the aberrations in the numerical example 2 of the invention in the telephoto end.
Figure 10:
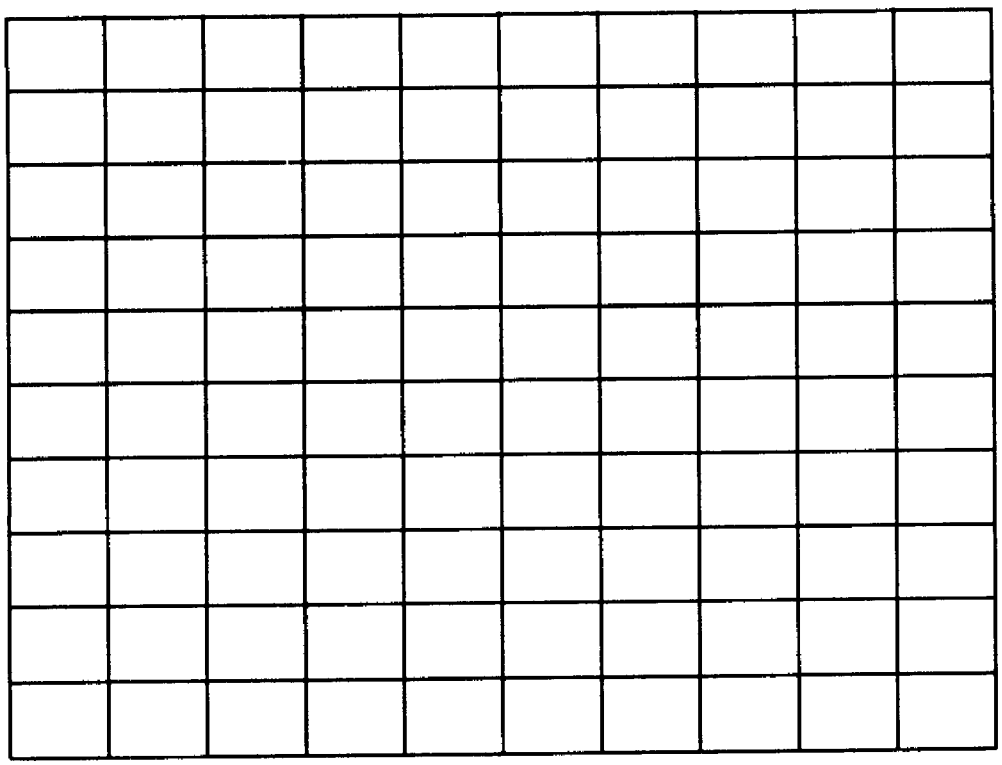
FIG. 10 is a plan view for explaining the distortion in the numerical example 2 of the invention.

FIGS. 8 to 10 show the lateral aberrations of the numerical example 2 in the wide-angle end and in the telephoto end and a lattice used for explaining the state of distortion.

Figure 11:
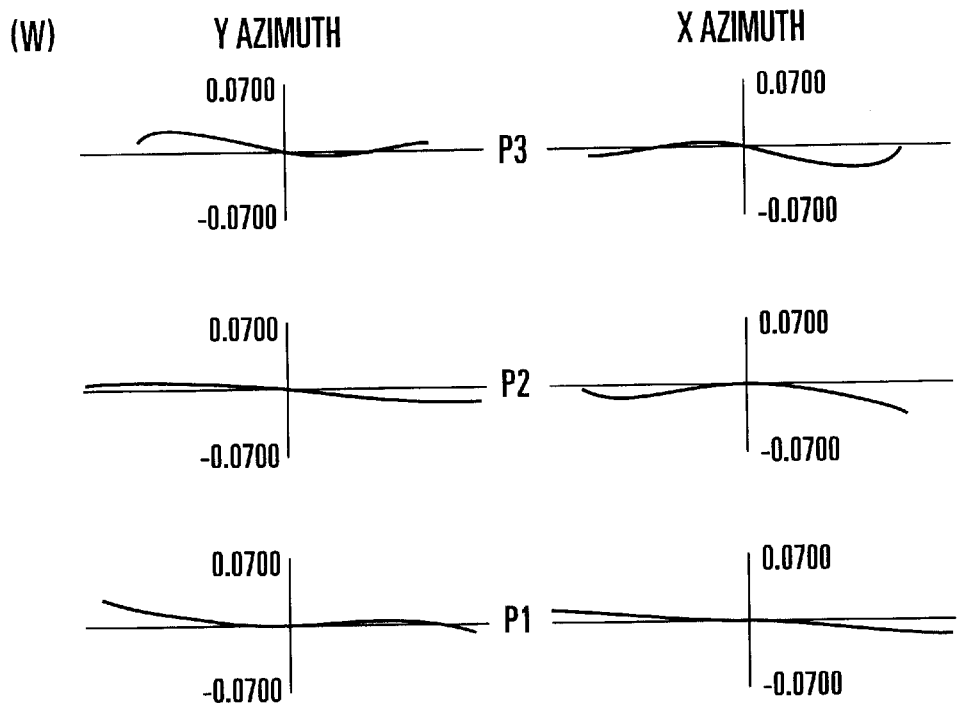
FIG. 11 shows graphic representations of the aberrations in the numerical example 3 of the invention in the wide-angle end.
Figure 12:
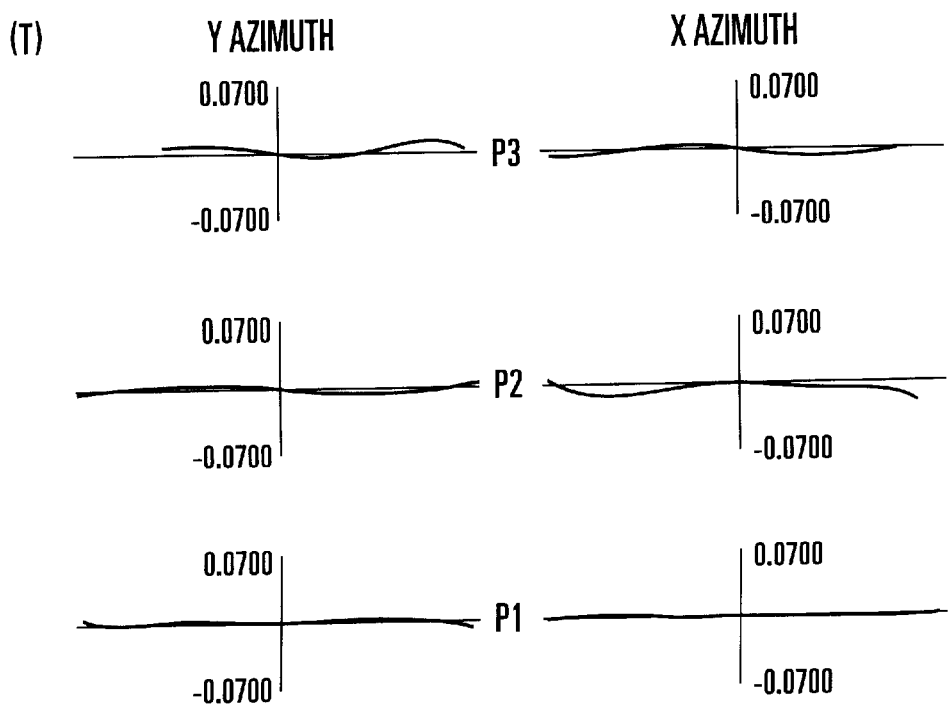
FIG. 12 shows graphic representations of the aberrations in the numerical example 3 of the invention in the telephoto end.
Figure 13:
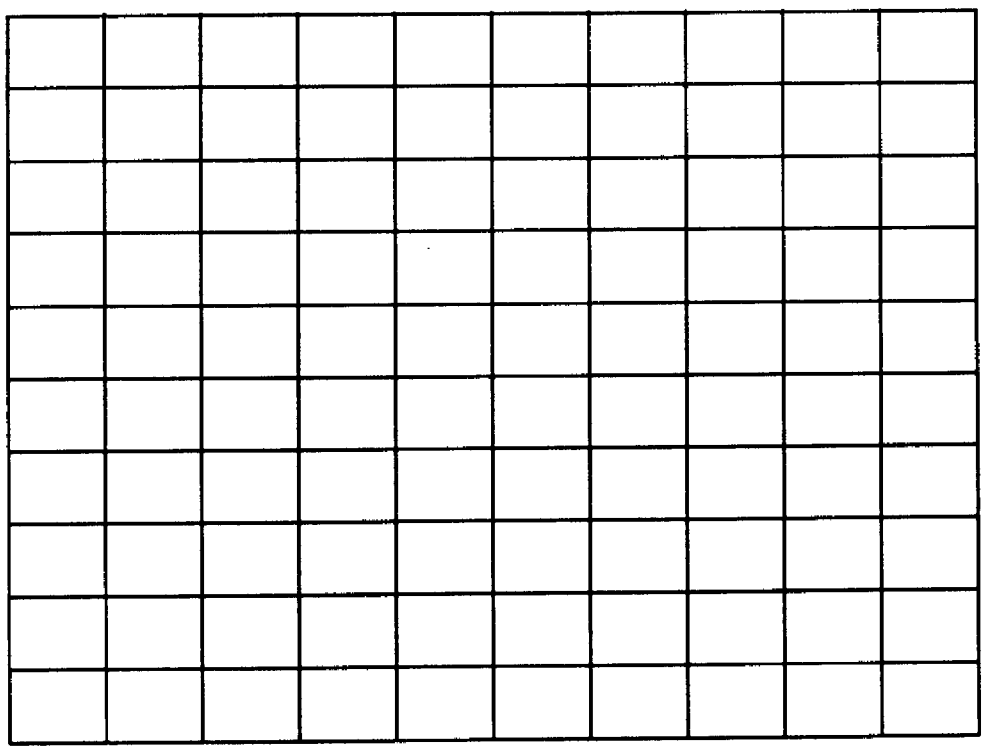
FIG. 13 is a plan view for explaining the distortion in the numerical example 3 of the invention.

FIGS. 11 to 13 show the lateral aberrations of the numerical example 3 in the wide-angle end and in the telephoto end and a lattice used for explaining the state of distortion.

Figure 14:
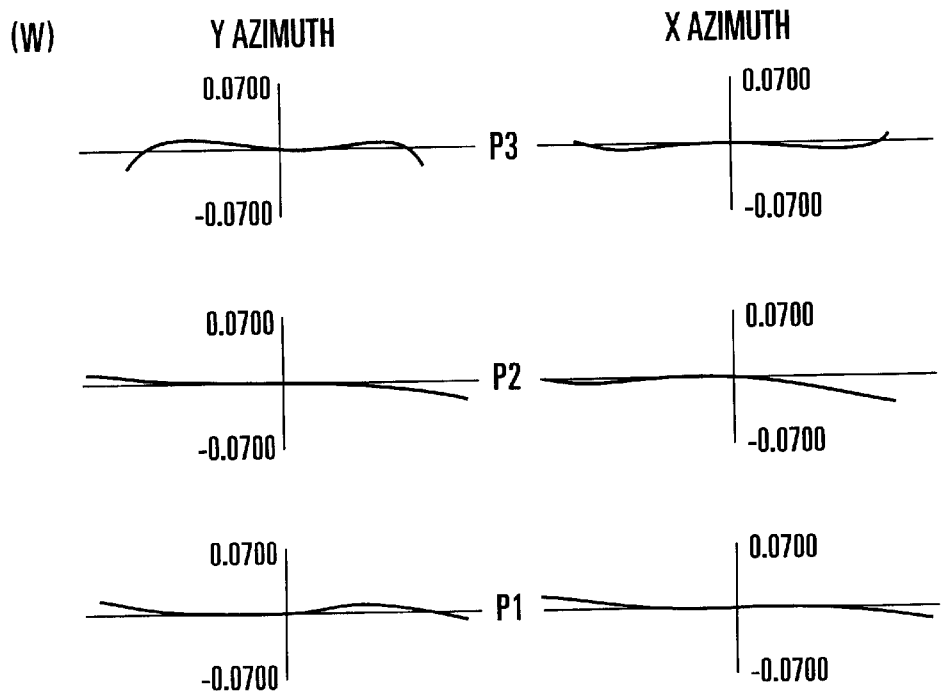
FIG. 14 shows graphic representations of the aberrations in the numerical example 4 of the invention in the wide-angle end.
Figure 15:
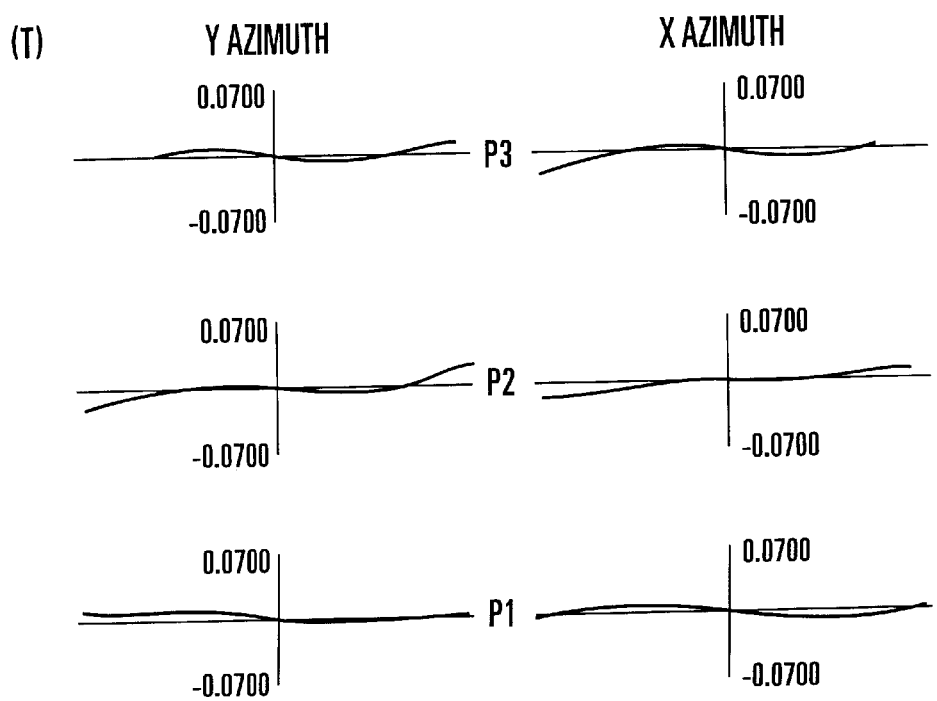
FIG. 15 shows graphic representations of the aberrations in the numerical example 4 of the invention in the telephoto end.
Figure 16:
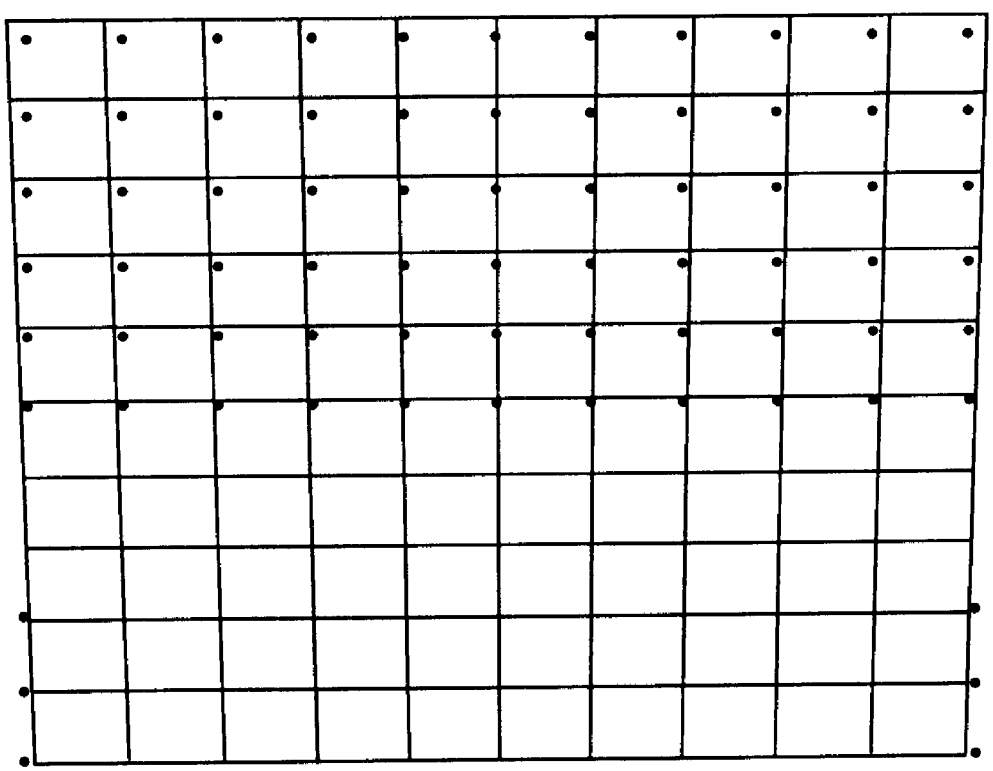
FIG. 16 is a plan view for explaining the distortion in the numerical example 4 of the invention.

FIGS. 14 to 16 show the lateral aberrations of the numerical example 4 in the wide-angle end and in the telephoto end and a lattice used for explaining the state of distortion.

Figure 17:
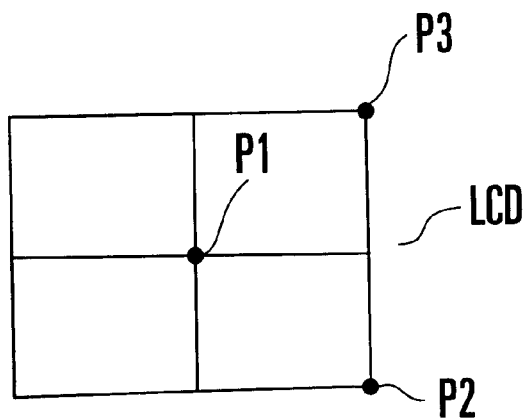
FIG. 17 is a diagram for explaining an original projection image in view of the distortion according to the invention.

The lateral aberrations are concerned with a central point P1 and two corners P2 and P3 in the projection image LCD, as shown in FIG. 17, and calculated by tracing rays of light from the screen S to the projection image LCD. The distortion represents the projection image itself when rays of light are traced from the projection image LCD to the screen S.

The first lens unit L1 of the projection lens LP is composed of, in order from the screen side (longer conjugate point), a lens (r1-r2) of meniscus form convex toward the screen side, a negative lens (r3-r4) of bi-concave form and a positive lens (r5-r6) of bi-convex form.

The second lens unit L2 of the projection lens LP is composed of, in order from the screen side (longer conjugate point), a positive lens (r7-r8) having a convex surface facing the projection image LCD (shorter conjugate point), a positive lens (r9-r10) having a convex surface facing the screen side, a negative lens (r11-r12) of bi-concave form, a positive lens (r13-r14) having a convex surface facing the screen side, and a positive lens (r15-r16) of bi-convex form.

Then, in the numerical example 1, a lens surface r1, facing the screen side, of the lens L11 is made to be an aspheric surface having no axial symmetry.

Also, in the numerical example 2, a lens surface r2, facing the projection image LCD, of the lens L11 is made to be an aspheric surface having no axial symmetry, and, in the numerical example 3, a lens surface r17, facing the screen side, of the positive lens L26 is made to be an aspheric surface having no axial symmetry.

Also, in the numerical example 4, both lens surfaces r1 and r2 of the lens L11 and both lens surfaces r17 and r18 of the positive lens L26 each are made to be an aspheric surface having no axial symmetry.

In the present invention, at least one of the surfaces constituting the projection lens LP is provided with an aspheric surface having no axial symmetry, so that it is possible to choose, for the design purposes, only an area corresponding to the liquid crystal panel LCD which is offset.

By this arrangement, despite a few lens surfaces, the distortion can be corrected well. Particularly, for the lens members on the enlarge projection side of the projection lens (that is, the ones nearest to the screen), and for the lens members nearest to the liquid crystal panel, the light beam utilizes only the upper or lower parts of the lens members. On this account, such places are selected to use the aspheric surface or surfaces having no axial symmetry, thus effectively correcting various aberrations (especially, distortion).

In the numerical examples 1 to 3, the projection lens LP (with exclusion of the aspheric surface having no axial symmetry) has its optical axis Ax set perpendicular to the enlarge projection plane (screen) S and the liquid crystal panel LCD.

Figure 18:
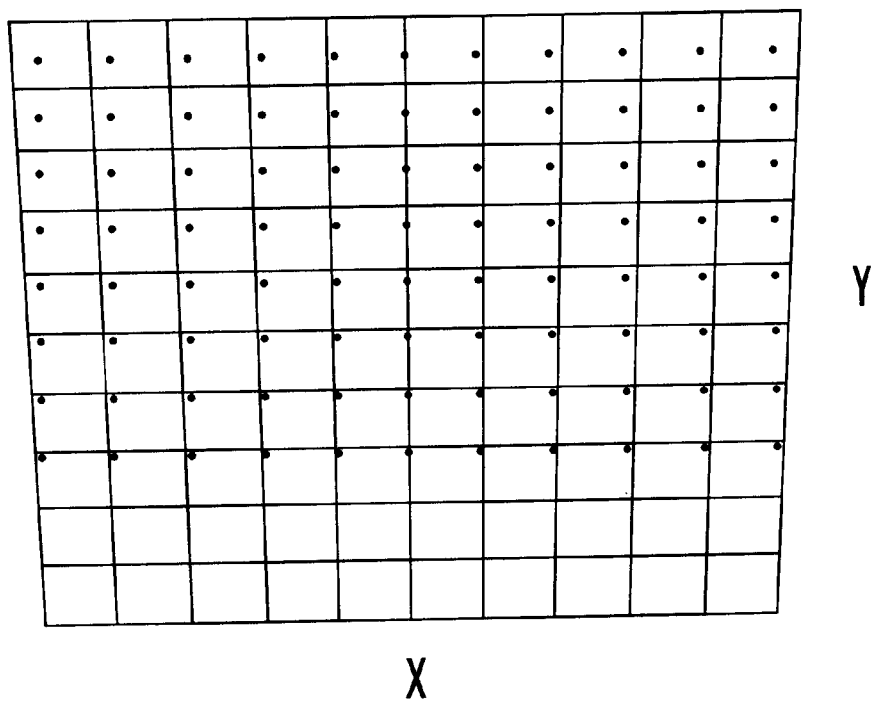
FIG. 18 is a plan view for explaining the distortion according to the invention.

In order to project the image even more upward onto the screen S, the liquid crystal projector is raised at its end nearest to the screen, being tilted upward. In this situation, as shown in FIG. 18, in addition to the corrected distortion, the projection lens LP produces a trapezoidal deformation due to the tilting.

Figure 19:
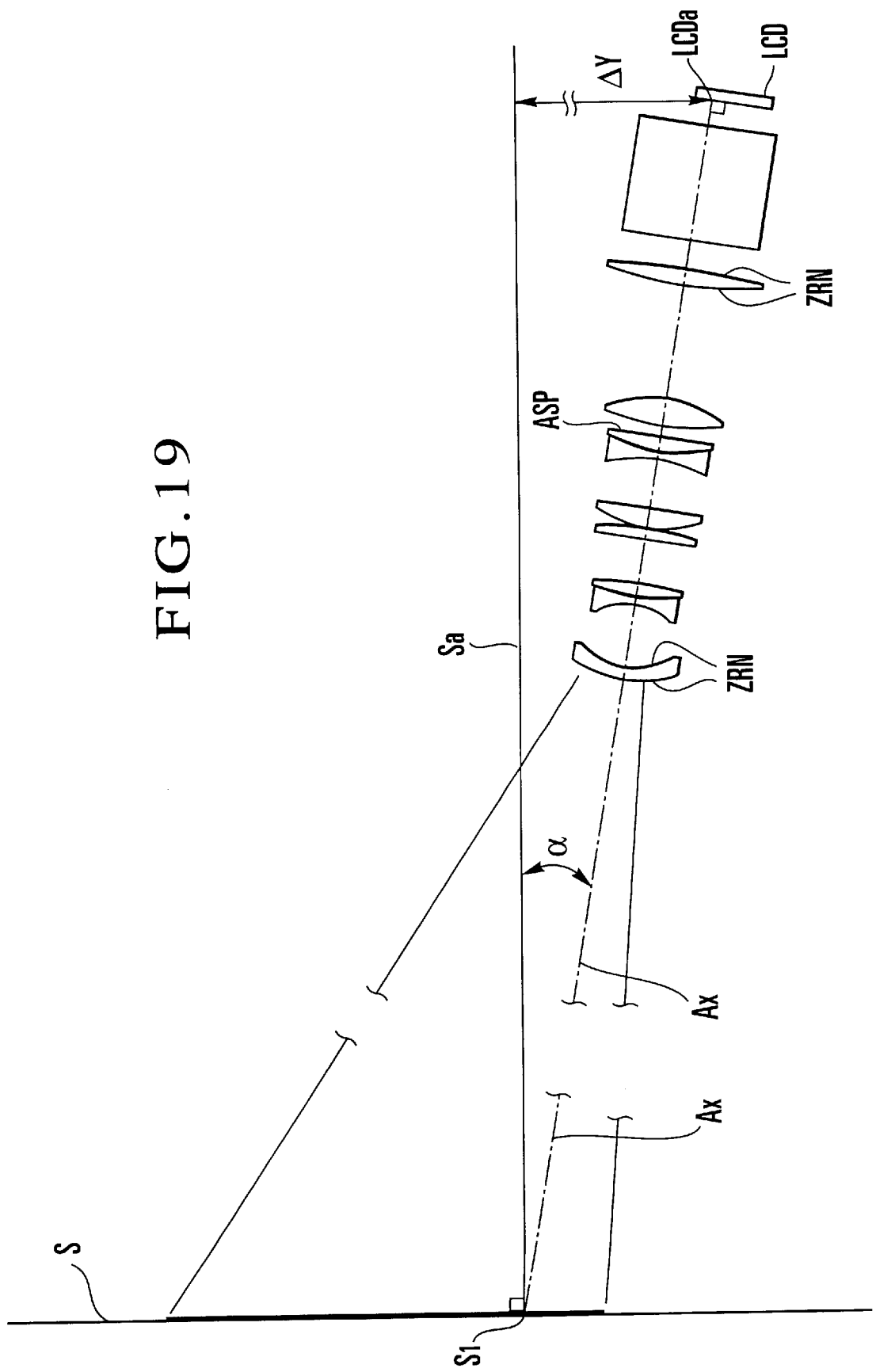
FIG. 19 is an enlarged view of FIG. 4.

The numerical example 4 is, as shown in FIG. 19 in the extended form, an example of design for the projection lens LP when used with its optical axis Ax tilted with respect to the enlarge projection plane (screen) S, while still permitting the resultant distortion to be corrected.

In FIG. 19, the reference axis (optical axis) Ax makes an angle of $\alpha=8°$ with a normal Sa of the screen S at the cross point S1 of the screen surface and the reference axis Ax, and the liquid crystal panel LCD is put below the normal Sa with the cross point LCDa of the liquid crystal panel and the reference axis Ax set at a distance of $\Delta Y=534.5$ mm.

In this connection, it should be noted that, in the projection lens according to the invention, if an angle e which the reference axis (reference optical axis) of the projection lens makes with the normal of the display panel LCD lies within the following range:

$$-5° < \theta < 5°,$$

an image displayed on the display panel LCD can be projected well onto the screen S.

Next, four numerical examples 1 to 4 of the invention are shown. In the numerical data for the examples 1 to 4, ri is the radius of curvature of the i-th lens surface, when counted from the enlarge projection side, di is the i-th axial lens thickness or air separation, when counted from the enlarge projection side, and ndi and vdi are respectively the refractive index and Abbe number of the i-th lens element.

The shape of an aspheric surface having axial symmetry is expressed in the coordinates with a z axis in the optical axis direction and a height h in the direction perpendicular to the optical axis, the direction from the screen to the display panel being taken as positive, by the following equation:

$$z = \frac{Ch^2}{1+\sqrt{1-(1+K)C^2h^2}} + Ah^4 + Bh^6 + Ch^8 + Dh^{10} + Eh^{12}$$

where C is the curvature of the osculating sphere, and K, A, B, C, D and E are the aspheric coefficients.

The shape of an aspheric surface having no axial symmetry is expressed in the coordinates with a z axis in the optical axis direction, a y axis in the direction perpendicular to the optical axis, and an x axis in the direction perpendicular to the z and y axes, the direction from the screen to the display panel being taken as positive, by the following equation:

$$z = \frac{c(x^2+y^2)}{1+\sqrt{1-(1+K)c^2(x^2+y^2)}} + \sum_j zj \cdot p_j$$

where c is the curvature of the osculating sphere, K and zj are the aspheric coefficients, and $p_3 = y$
$p_4 = x^2 - y^2$
$p_5 = 2x^2 + 2y^2 - 1$
$p_9 = 3x^2y + 3y^3 - 2y$
$p_{10} = 3x^2y - y^3$
$p_{11} = x^4 - 6x^2y^2 + y^4$
$p_{12} = 4x^4 - 4y^4 - 3x^2 + 3y^2$
$p_{13} = 6x^4 + 12x^2y^2 + 6y^4 - 6x^2 - 6y^2 + 1$
$p_{23} = 6x^6 - 30x^4y^2 - 30x^2y^4 + 6y^6 - 5x^4 + 30x^2y - 5y^4$
$p_{24} = 15x^6 + 15x^4y^2 - 15x^2y^4 - 15y^6 - 20x^4 + 20y^4 + 6x^2 - 6y^2$
$p_{25} = 20x^6 + 60x^4y^2 + 60x^2y^4 + 20y^6 - 30x^4 - 60x^2y^4 - 30y^4 + 12x^2 + 12y^2 + 1$.

Figure 20:
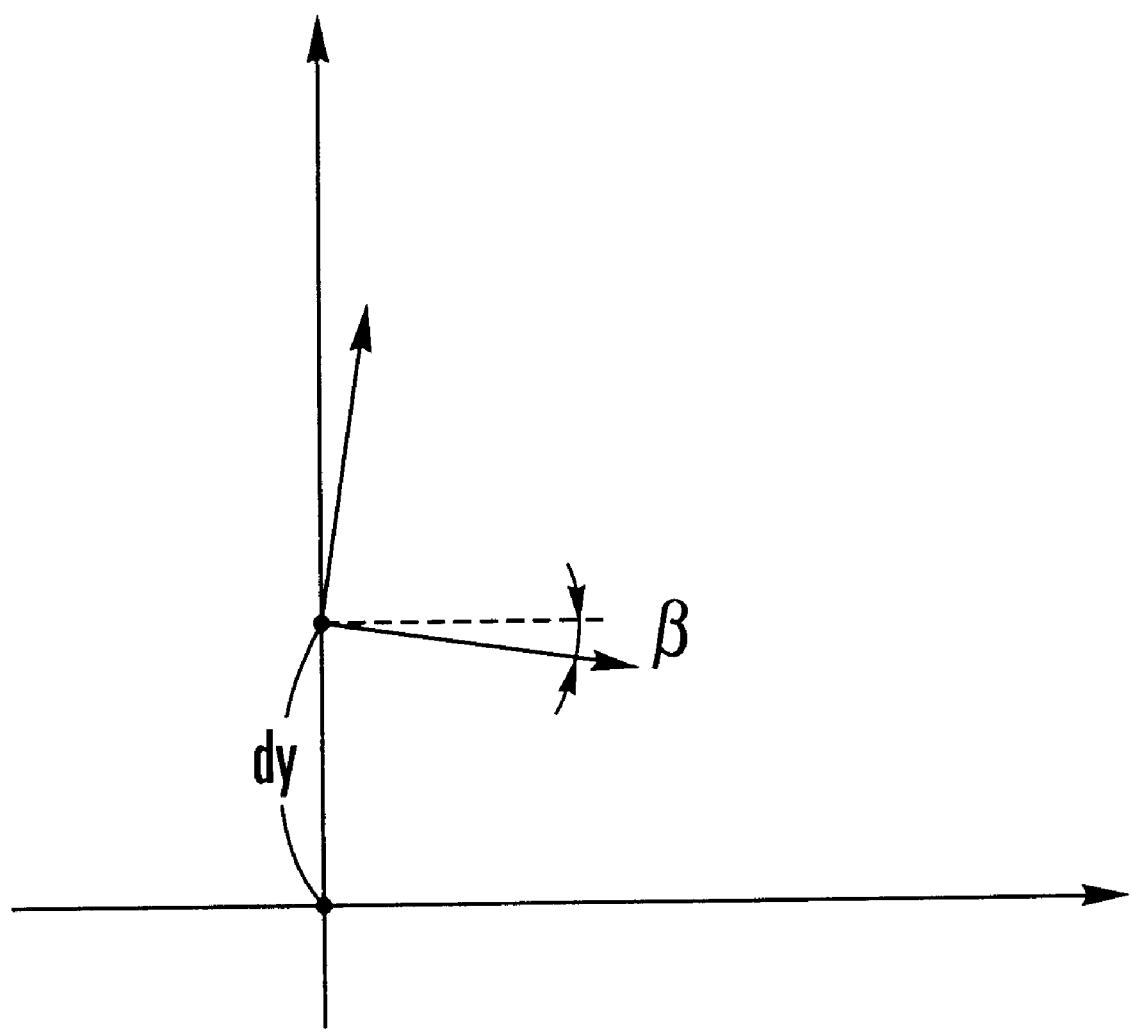
FIG. 20 is a graph for explaining the coordinates for the lens surface of the projection lens according to the invention.
Figure 21:
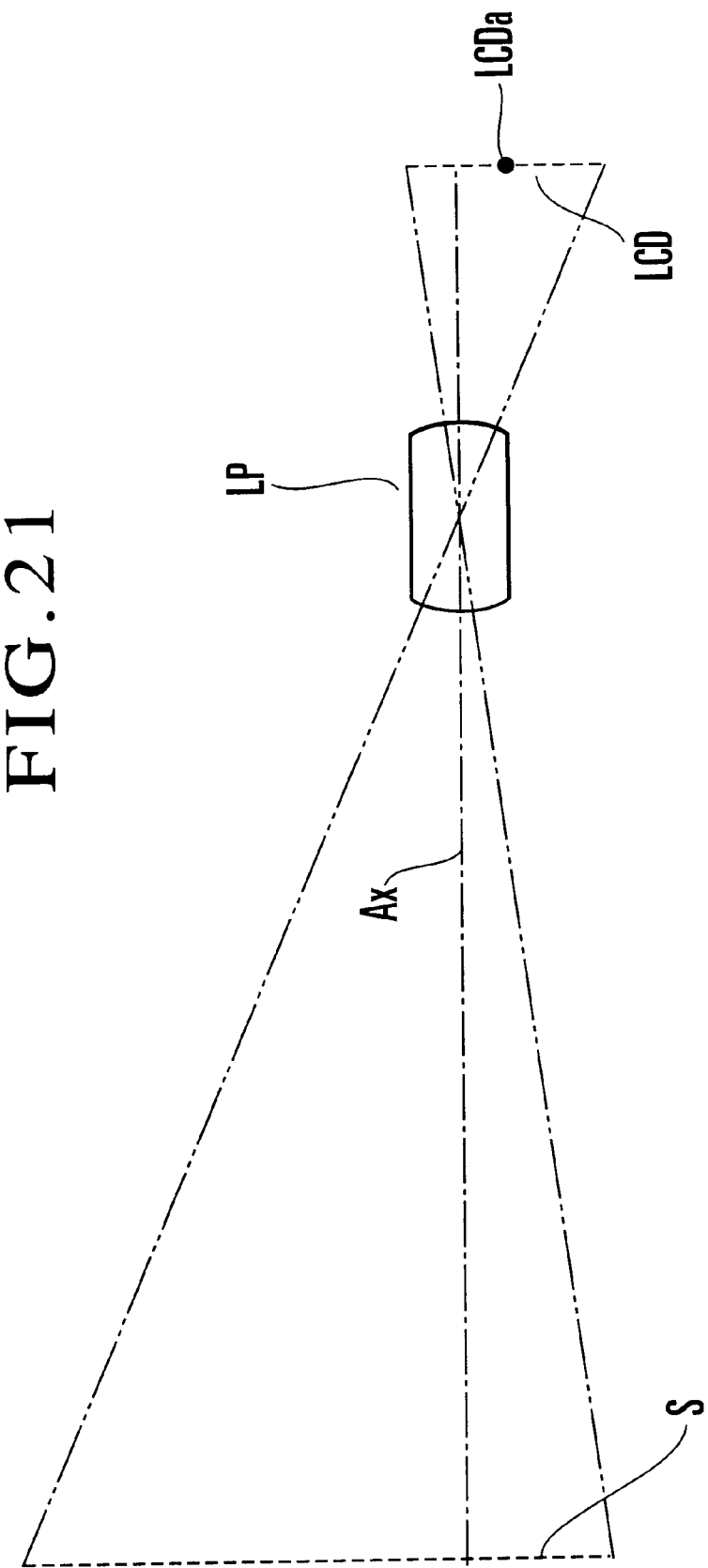
FIG. 21 is a diagram for explaining the conventional liquid crystal projector.
Figure 22:
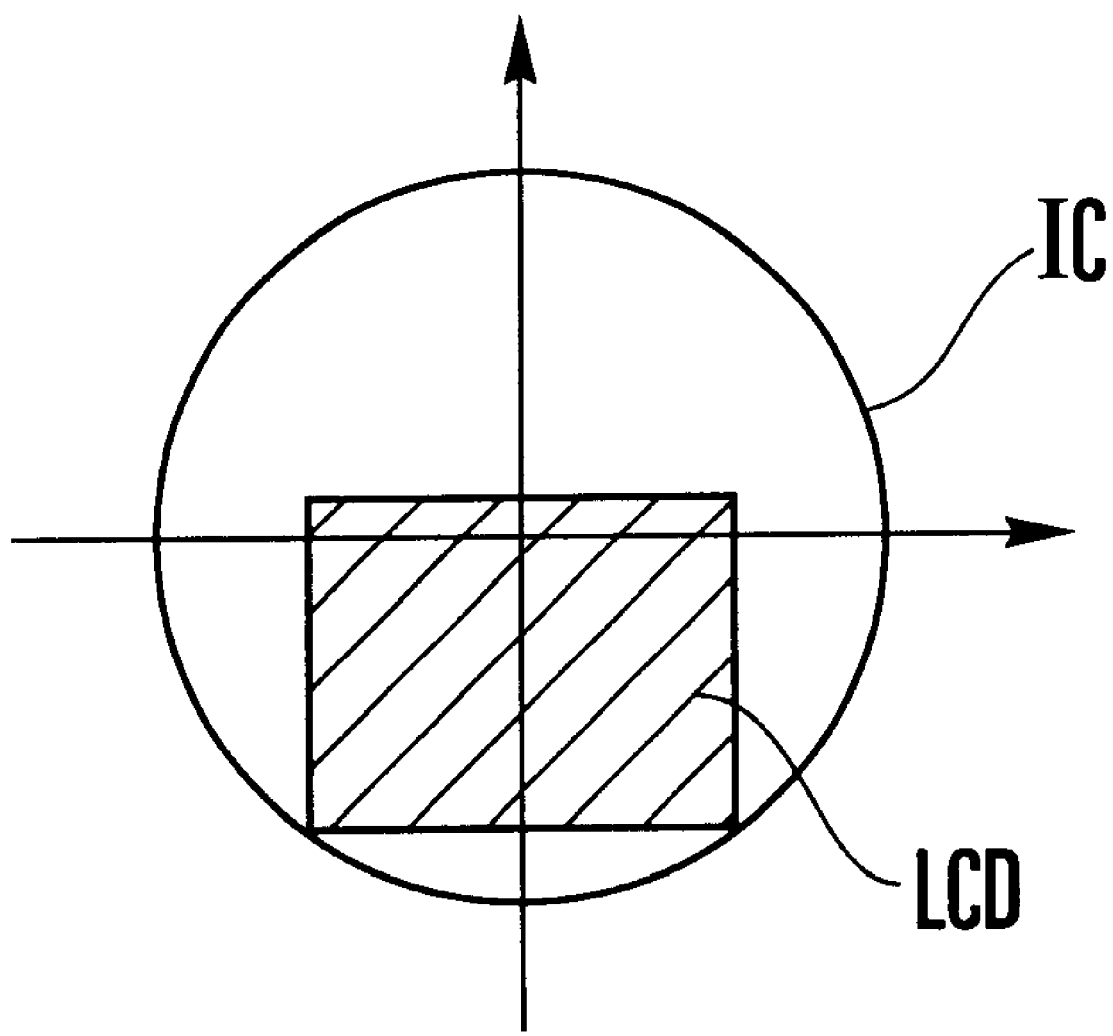
FIG. 22 is a plan view for explaining a part of the liquid crystal projector shown in FIG. 21.

In each numerical example, taking a common axis of symmetry of all the spherical surfaces as the reference axis, the aspheric surface having no axial symmetry has its original point of the equation for the shape lying not on this reference axis, or moved therefrom in coordinates as shown in FIG. 20. Therefore, data of the original point of the equation for the shape of the aspheric surface having no axial symmetry are described as decentering data together with the lens data.

NUMERICAL EXAMPLE 1

| f:47.2~73.2 Fno:2.51~3.69 ωx:15.63~10.22 ωy:19.72~13.01 | | | | |
|---|---|---|---|---|
| | r | d | nd | vd |
| 1 | Asphere | 4.20 | 1.492 | 57.4 |
| 2 | 26.141 | 24.99 | | |
| 3 | −24.377 | 2.00 | 1.581 | 40.8 |
| 4 | 63.361 | 0.18 | | |
| 5 | 66.940 | 4.28 | 1.805 | 25.4 |
| 6 | −84.774 | Variable | | |
| 7 | 894.781 | 3.58 | 1.603 | 60.7 |
| 8 | −91.106 | 0.20 | | |
| 9 | 42.480 | 5.15 | 1.639 | 55.4 |
| 10 | 367.733 | 20.58 | | |
| 11 | −56.665 | 2.50 | 1.741 | 27.8 |
| 12 | 45.375 | 1.02 | | |
| 13 | 69.625 | 4.31 | 1.492 | 57.4 |
| 14 | Asphere | 2.98 | | |
| 15 | 84.679 | 9.45 | 1.516 | 64.1 |
| 16 | −40.811 | Variable | | |
| 17 | 111.360 | 6.00 | 1.516 | 64.1 |
| 18 | −216.146 | 9.98 | | |
| 19 | inf. | 40.00 | 1.516 | 64.1 |
| 20 | inf. | | | |

| Variable | Zooming Position | |
|---|---|---|
| Separation | W | T |
| d6 | 15.56 | 3.00 |
| d16 | 39.48 | 90.96 |

Aspheric Coefficients of aspheric surface having axial symmetry:

For r14, c(1/r): −2.641e-03 K: −1.345e+01 A: 4.626e-06 B: 1.900e-10 C: 7.502e-13 D: −8.734e-15 E: 0.000e+00

Aspheric Coefficients of aspheric surface having no axial symmetry:

For r 1, c(1/r): 1.763e-02 K: 3.886e+00 z 4: −9.177e-07 z 5: 2.131e-05 z11: 3.457e-09 z12: 1.826e-09 z13: 3.898e-07 z23: −3.750e-12 z24: −1.587e-12 z25: −2.517e-12

NUMERICAL EXAMPLE 2

| f:47.2~73.2 Fno:2.51~3.69 ωx:15.63~10.22 ωy:19.72~13.01 | | | | |
|---|---|---|---|---|
| | r | d | nd | νd |
| 1 | Asphere | 4.20 | 1.49 | 57.4 |
| 2 | Asphere | 24.89 | | |
| 3 | −24.294 | 2.00 | 1.581 | 40.8 |
| 4 | 62.607 | 0.17 | | |
| 5 | 66.026 | 4.29 | 1.805 | 25.4 |
| 6 | −85.178 | Variable | | |
| 7 | 1075.082 | 3.60 | 1.603 | 60.7 |
| 8 | −92.697 | 0.20 | | |
| 9 | 42.537 | 5.23 | 1.639 | 55.4 |
| 10 | 455.826 | 20.43 | | |
| 11 | −56.178 | 2.50 | 1.741 | 27.8 |
| 12 | 45.490 | 0.98 | | |
| 13 | 68.240 | 4.33 | 1.492 | 57.4 |
| 14 | Asphere | 3.09 | | |
| 15 | 85.674 | 9.44 | 1.516 | 64.1 |
| 16 | −40.755 | Variable | | |
| 17 | 111.796 | 5.99 | 1.516 | 64.1 |
| 18 | −216.795 | 9.98 | | |
| 19 | inf. | 40.00 | 1.516 | 64.1 |
| 20 | inf. | | | |

| Variable | Zooming Position | |
|---|---|---|
| Separation | W | T |
| d6 | 15.49 | 3.00 |
| d16 | 39.66 | 91.18 |

Aspheric Coefficients of aspheric surface having axial symmetry:

For r 1, c(1/r): 1.815e-02 K: 3.645e+00 A: 2.058e-06 B:−2.203e-10 C: 7.966e-13 D: 0.000e+00 E: 0.000e+00 r14, c(1/r):−2.616e-03 K:−7.274e+01 A: 4.638e-06 B: 4.770e-10 C:−3.106e-14 D:−7.398e-15 E: 0.000e+00

Aspheric Coefficients of aspheric surface having no axial symmetry:

For r 2, c(1/r): 3.900e-02 K: 9.493e-02 z 3: −2.911e-05 z 4: −1.614e-07 z 5: −2.198e-05 z13: −1.782e-07 z25: −9.723e-11

NUMERICAL EXAMPLE 3

| f:47.2~73.1 Fno:2.57~3.73 ωx:15.64~10.23 ωy:19.73~13.02 | | | | |
|---|---|---|---|---|
| | r | d | nd | νd |
| 1 | Asphere | 4.20 | 1.492 | 57.4 |
| 2 | 28.832 | 22.20 | | |
| 3 | −23.880 | 2.00 | 1.581 | 40.8 |
| 4 | 68.612 | 0.22 | | |
| 5 | 73.835 | 4.62 | 1.805 | 25.4 |
| 6 | −73.326 | Variable | | |
| 7 | 9046.483 | 4.31 | 1.603 | 60.7 |
| 8 | −98.245 | 0.20 | | |
| 9 | 41.994 | 6.51 | 1.639 | 55.4 |
| 10 | 1023.504 | 18.90 | | |
| 11 | −57.529 | 2.50 | 1.741 | 27.8 |
| 12 | 43.285 | 0.73 | | |
| 13 | 55.926 | 4.45 | 1.492 | 57.4 |
| 14 | Asphere | 3.05 | | |
| 15 | 79.980 | 9.27 | 1.516 | 64.1 |
| 16 | −42.281 | Variable | | |
| 17 | Asphere | 5.78 | 1.492 | 57.4 |
| 18 | −102.863 | 9.98 | | |
| 19 | inf. | 40.00 | 1.516 | 64.1 |
| 20 | inf. | | | |

| Variable | Zooming Position | |
|---|---|---|
| Separation | W | T |
| d6 | 15.57 | 3.00 |
| d16 | 41.86 | 92.49 |

Aspheric Coefficients of aspheric surface having axial symmetry:

For r 1, c(1/r): 1.166e-02 K: 1.048e+01 A: 2.887e-06 B: −3.749e-10 C: 9.292e-13 D: 0.000e+00 E: 0.000e+00
For r14, c(1/r):−1.952e-04 K:−5.410e+04 A: 5.199e-06 B: 1.646e-09 C:−4.933e-12 D:−6.981e-16 E: 0.000e+00

Aspheric Coefficients of aspheric surface having no axial symmetry:

For r17, c(1/r): 4.518e-03 K: −5.813e+01 z 2: −2.594e-05 z 4: −2.346e-08 z 5: −8.619e-05 z11:−7.525e-10 z12: 9.041e-11 z13: 2.958e-08 z23: −1.454e-13 z24: −1.311e-14 z25: −1.094e-11

NUMERICAL EXAMPLE 4

| f:47.2~73.2 Fno:2.51~3.60 ωx:15.63~10.23 ωy:19.72~13.01 | | | | |
|---|---|---|---|---|
| | r | d | nd | νd |
| 1 | Asphere | 4.20 | 1.492 | 57.4 |
| 2 | Asphere | 22.46 | | |
| 3 | −23.833 | 2.00 | 1.581 | 40.8 |
| 4 | 68.512 | 0.82 | | |
| 5 | 81.776 | 4.63 | 1.805 | 25.4 |
| 6 | −75.185 | Variable | | |
| 7 | −6266.770 | 3.27 | 1.603 | 60.7 |
| 8 | −107.530 | 0.20 | | |
| 9 | 42.619 | 7.11 | 1.639 | 55.4 |
| 10 | −550.693 | 17.56 | | |
| 11 | −52.483 | 2.50 | 1.741 | 27.8 |
| 12 | 45.852 | 0.80 | | |
| 13 | 64.287 | 4.47 | 1.492 | 57.4 |
| 14 | Asphere | 4.28 | | |
| 15 | 99.741 | 9.43 | 1.516 | 64.1 |
| 16 | −42.096 | Variable | | |
| 17 | Asphere | 5.83 | 1.516 | 64.1 |
| 18 | Asphere | 9.98 | | |
| 19 | inf. | 40.00 | 1.516 | 64.1 |
| 20 | inf. | | | |

| Variable | Zooming Position | |
|---|---|---|
| Separation | W | T |
| d6 | 15.99 | 3.00 |
| d16 | 40.59 | 90.11 |

Aspheric Coefficients of aspheric surface having axial symmetry:

For r14, c(1/r):−3.465e-03 K:−1.157e+01 A: 4.676e-06 B: 1.461e-09 C:−4.218e-12 D:−2.289e-16 E: 0.000e+00

Aspheric Coefficients of aspheric surface having no axial symmetry:

For r 1, c(1/r): 1.550e-02 K: 5.961e+00 z 3: 6.129e-03 z 4: −3.581e-06 z 5: 2.009e-04 z 9: −3.693e-07 z10: 7.064e-07 z11: 4.792e-07 z12: 2.189e-08 z13: 2.960e-07 z23: 1.450e-11 z24: −6.346e-12 z25: −6.194e-11

For r 2, c(1/r): 3.615e-02 K: 0.000e+00 z 5: 1.658e-04 z 9: −2.011e-06 z10: 7.746e-07 z11: 5.342e-07 z12: 1.973e-08 z13: −1.911e-07 z23: 1.228e-10 z24: −1.137e-14 z25: −1.873e-10

For r17, c(1/r): 6.412e-04 K: 0.000e+00 z 5: 3.949e-04 z 9: −3.517e-06 z10: 1.393e-06 z11: 3.622e-07 z12: 1.017e-08 213: 1.276e-07 z23: 1.745e-10 z24: −2.981e-11 z25: 4.313e-11

For r18, c(1/r): −1.274e-02 K: 0.000e+00 z 5: 5.047e-04 z 9: −3.272e-06 z10: 4.507e-07 z11: 4.402e-07 z12: 1.430e-08 z13: 3.482e-07 z23: 1.704e-10 z24: −2.876e-11 z25: 3.458e-11

Decentering Data

| r | dy (mm) | β (degree) |
|---|---|---|
| 1 | −0.11 | 0.06 |
| 2 | −0.06 | −0.50 |
| 17 | 1.36 | −1.32 |
| 18 | 1.64 | 0.02 |

It will be appreciated from the foregoing that, according to the invention, an aspheric surface having no axial symmetry is employed in part of the optical system.

It is, therefore, made possible to achieve a projection lens which, when projecting the image obliquely, corrects well the trapezoidal deformation and distortion, and an image projection apparatus using the same.

What is claimed is:

1. A projection lens arranged to project an image formed by a display panel onto a projected plane, said projection lens comprising:

at least one lens surface of shape having no symmetry axis;

wherein a center of said display panel is offset from the optical axis of said projection lens.

2. A projection lens according to claim 1, wherein said display panel and the optical axis are almost orthogonal with each other.

3. A projection lens according to claim 1, satisfying the following condition:

$$5° < \theta < 5°$$

where θ is an angle which a normal of said display panel makes with the optical axis.

4. A projection lens according to claim 1, wherein at least one of the lenses constituting said plurality of lens units has at least one aspheric surface of shape having symmetry with respect to the axis.

5. A projection lens according to claim 1, wherein said projection lens comprises, in order from the screen side, a negative lens unit having a negative refractive power and a positive lens unit having a positive refractive power.

6. A projection lens according to claim 5, wherein said negative lens unit has a lens surface of shape having no symmetry with respect to the axis.

7. A projection lens arranged to project an image formed by a display panel onto a projected plane, said projection lens comprising:

in order from the projected plane, a negative lens unit having a negative refractive power, having in order from the projected plane, a lens of meniscus form convex toward the projected plane, a lens of bi-concave form, and a lens of bi-convex form, a positive lens unit having a positive refractive power, wherein said projection lens comprises at least one lens surface of shape having no symmetry axis.

8. A projection lens arranged to project an image formed on a display panel onto a projected plane comprising:

in order from the projected plane side, a negative lens unit having a negative refractive power and a positive lens unit having a positive refractive power, said negative lens unit having a lens surface, facing the projected plane, of shape having no symmetry axis.

9. A projection lens arranged to project an image formed on a display panel onto a projected plane, said projection lens comprising:

in order from the projection plane, a negative lens unit having a negative refractive power, a positive lens unit having a positive refractive power, having an aspheric surface of shape having symmetry with respect to said optical axis, wherein said projection lens comprises at least one lens surface of shape having no symmetry axis.

10. A projection lens according to claim 1, further comprising:

a plurality of lens units movable along the optical axis for varying magnification.

11. A projection lens according to claim 7, said negative lens unit and said positive lens unit move along the optical axis for varying magnification.

12. A projection lens according to claim 9, said negative lens unit and said positive lens unit move along the optical axis for varying magnification.

13. A projection apparatus for projecting an image formed by a display panel onto a projected plane, said apparatus comprising:

an illumination optical system for illuminating the display panel with light from a light source; and a projection optical system for projecting the image onto the projected plane, wherein said projection optical system includes at least one optical surface of shape having no symmetry axis, and wherein a center of said display panel is offset from an optical axis of said projection optical system.

14. A projection apparatus comprising:

a projection optical system for projecting an image formed by a display panel onto a projected plane, said system having, in order from the projected plane side, a negative optical unit having a negative refractive power and a positive optical unit having a positive refractive power, wherein said negative optical unit has an optical surface of shape having no symmetry axis.

15. A projection apparatus comprising:

a projection optical system for projecting an image formed by a display panel onto a projected plane, said system having, in order from the projected plane side, a negative optical unit having a negative refractive power and a positive optical unit having a positive refractive power, wherein said negative optical unit comprises, in order from the projected plane side, a lens of meniscus form convex toward the projected plane side, a lens of bi-concave form, and a lens of bi-convex form.

16. A projection apparatus comprising:

a projection optical system for projecting an image formed by a display panel onto a projected plane, said system having, in order from the projected plane side, a negative optical unit having a negative refractive power and a positive optical unit having a positive refractive power, wherein said system has at least one optical surface of shape having no symmetry axis, and wherein said positive optical unit has at least one aspheric surface having symmetry with respect to an optical axis of said projection optical system.

17. A projection optical system for projecting an image formed by a display panel onto a projected plane, said projection optical system comprising:

at least one optical surface of shape having no symmetry axis, wherein a center of said display panel is offset from an optical axis of said projection optical system.

18. A projection apparatus for projecting an image formed by a display panel onto a projected plane, said apparatus comprising;

an illumination optical system for illuminating the display panel with light from a light source; and a projection optical system for projecting the image onto the projected plane, wherein said projection optical system includes at least one optical surface of shape having no symmetry axis, and wherein a center of said display panel is offset from an optical axis of said projection optical system.

19. A projection apparatus for projecting an image formed by a display panel onto a projected plane, said apparatus comprising:

an illumination optical system for illuminating the display panel with light from a light source, and said projection lens according to claim 1.

20. A projection apparatus for projecting an image formed by a display panel onto a projected plane, said apparatus comprising:

an illumination optical system for illuminating the display panel with light form a light source, and said projection lens according to claim 7.

21. A projection apparatus for projecting an image formed by a display panel onto a projected plane, said apparatus comprising:

an illumination optical system for illuminating the display panel with light from a light source, and said projection lens according to claim 8.

22. A projection apparatus for projecting an image formed by a display panel onto a projected plane, said apparatus comprising:

an illumination optical system for illuminating the display panel with light from a light source, and said projection lens according to claim 9.

* * * * *

UNITED STATES PATENT AND TRADEMARK OFFICE
CERTIFICATE OF CORRECTION

PATENT NO. : 6,452,727 B1
DATED : September 17, 2002
INVENTOR(S) : Atsushi Okuyama It is certified that error appears in the above-identified patent and that said Letters Patent is hereby corrected as shown below:

<u>Column 6,</u>
Line 19, please delete "$30x^2y$" and insert therefore -- $30x^2y^2$ --

<u>Column 7,</u>
Line 3, please delete "1.763e" and insert therefore -- 1.753e --
Line 43, please insert -- For -- after "00"

<u>Column 9,</u>
Line 50, please delete "$5^{\circ} < \theta < 5^{\circ}$" and insert therefore -- $-5^{\circ} < \theta < 5^{\circ}$ --

Signed and Sealed this

Ninth Day of March, 2004

JON W. DUDAS
*Acting Director of the United States Patent and Trademark Office*